(No Model.)
W. H. SARGENT.
FILTER.
No. 434,570. Patented Aug. 19, 1890.
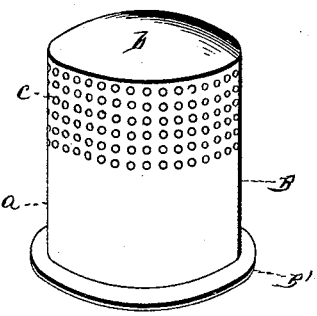
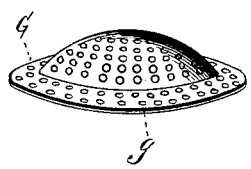
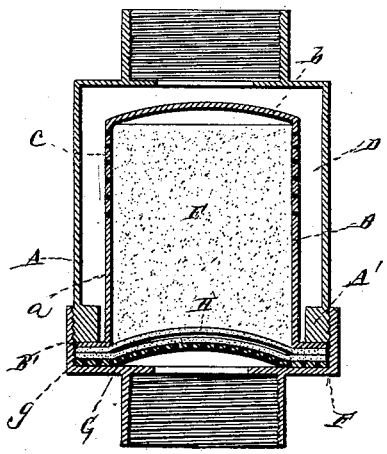
WITNESSES
INVENTOR
W. H. Sargent
by E. W. Anderson
his Attorney

UNITED STATES PATENT OFFICE.

WILLIAM HENRY SARGENT, OF SOUTH WEYMOUTH, MASSACHUSETTS.

FILTER.

SPECIFICATION forming part of Letters Patent No. 434,570, dated August 19, 1890.

Application filed January 23, 1890. Serial No. 337,905. (No model.)

*To all whom it may concern:*

Be it known that I, WILLIAM HENRY SARGENT, of South Weymouth, in the county of Norfolk, in the State of Massachusetts, have invented a new and Improved Filter, of which the following is a description sufficiently full and clear to enable any person skilled in the art or science to which said invention appertains to make and use the same, reference being had to the accompanying drawings, forming a part of this specification.

The object of the invention is to provide a simple, effective, and inexpensive filter and one which can be readily renewed and cleansed.

In the accompanying drawings, Figure 1 is a vertical section; Fig. 2, a detail of the interior filtering-chamber, and Figs. 3 and 4 details.

In the drawings, A represents the outside metallic case, preferably circular in form, and having an annular flange A' at its interior bottom portion. In said case A is placed a thimble-shaped case or filtering-chamber B, having a lower imperforated portion $a$, closed top portion $b$, and perforated upper portion $c$, said perforated portion $c$ forming a filtering-screen. This case or chamber B is provided with the annular flange B' at its exterior bottom portion, said flange being adapted to rest beneath the flange A' and securely hold the case in position. An open chamber D is formed between the exterior and interior chambers or cases, said chamber receiving and holding the impurities which will be deposited at its lower portion by the water or other fluid striking against the screen and imperforated portions of the inner case. The inner case B is adapted to contain loose filtering material E, of suitable character, such as charcoal, quartz, asbestus, or other material.

F represents a removable cap or bottom piece secured to the case A and adapted to engage and hold the filtering-chambers in place, and having the convex or upwardly-curved perforated plate G, adapted to be placed beneath the case B, said plate being provided with a flange $g$ for holding it in position.

Between the filtering material E and the plate G are interposed one or more felt screens H, which are held in position by means of the annular flanges A' and B', hereinbefore referred to, the said curved plate $g$ also serving to center said screens and hold them and the loose filtering material in position.

The impurities in the water or other fluid as they strike against the screen and top portion of the inner case will fall to the bottom of the chamber D, where they will remain and will not rise to clog the screen.

By the arrangement of the felt screens beneath the loose filtering material the water will pass through both the screen and the filtering material before reaching said felt screens, which, being of fine texture, thoroughly remove all remaining impurities from the fluid.

By causing a reverse flow of water through the parts they will be readily cleansed. It will also be seen that the filtering material and felt screens may be easily renewed or replaced.

Having described this invention, what I claim, and desire to secure by Letters Patent, is—

The herein-described filter, consisting, essentially, of the outer case A, having the interior annular flange A', filtering case or chamber B in said outer case, having the annular flange B' at its exterior bottom portion, the said interior case or chamber consisting of the imperforated lower portion, perforated upper portion forming a screen, and the closed top portion, an open chamber between the outer and inner case, loose filtering material in said inner case, removable cap or bottom piece F, having the upwardly-curved or convex perforated plate G arranged beneath said loose filtering material and provided with the flange $g$ for holding it in position, and a felt screen or screens between said perforated plate and filtering material, substantially as described.

WILLIAM HENRY SARGENT.

Witnesses:
QUINCY L. REED,
EZEKIEL W. MORTON.